United States Patent Office 3,155,628
Patented Nov. 3, 1964

3,155,628
PRODUCTION OF POLYMERS CONTAINING s-TRIAZINE NUCLEI LINKED TOGETHER BY A NITROGEN ATOM COMPRISING REACTING s-TRIAZINES WITH NITROGEN COMPOUNDS
Peter Richard Bloomfield, London, England, assignor to Artrite Resins Limited, London, England, a British company
No Drawing. Filed Mar. 20, 1961, Ser. No. 96,709
Claims priority, application Great Britain Mar. 22, 1960
18 Claims. (Cl. 260—2)

This invention relates to the preparation of organic compounds and is particularly concerned with improved methods of preparing polycondensates containing the s-triazine nuclei.

It is an object of the present invention to provide a method of preparing linear, branched or cross-linked polycondensates containing the s-triazine nuclei linked together by single nitrogen atoms.

According to the present invention there is provided a method of preparing polycondensates containing s-triazine nuclei linked together by single nitrogen atoms, which method comprises reacting a dihalo-s-triazine having the formula

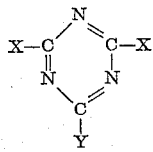

where X=chlorine or bromine, and Y=R or a disubstituted amino group and where R=alkyl, aryl or substituted aryl group, with a nitrogen-containing compound selected from the group consisting of a primary amine, ammonia and an amino-s-triazine having the formula

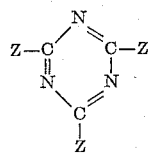

where Z=R as defined above, or an amino or a mono- or di-substituted amino group, and the groups Z in any one molecule may be alike or different, the molecule containing at least one amino or at least two mono-substituted amino groups directly attached to the s-triazine ring.

Preferably each mole of the dihalo-s-triazine is reacted with from 0.5 to 1.5 moles of ammonia or the primary amine, or with from 0.5 to 2.0 moles of the amino-s-triazine.

The nitrogen-containing compound may be ammonia in the form of an ammonium halide, or a primary amine in the form of its hydrohalide, the halide being preferably a chloride or bromide. Use of a nitrogen-containing compound in halide form is particularly desirable where ammonia or a volatile amine is being used, as the reaction may then be carried out under atmospheric conditions.

When it is desired that the polycondensate is a substantially linear compound, it is preferred that each mole of dihalo-s-triazine is reacted with from 1.0 to 1.2 moles of the nitrogen-containing compound, or with 1.0 to 1.2 moles of a mixture of such nitrogen containing compound. The nitrogen-containing compound may be a primary amine, in which case the reaction may be exemplified as follows:

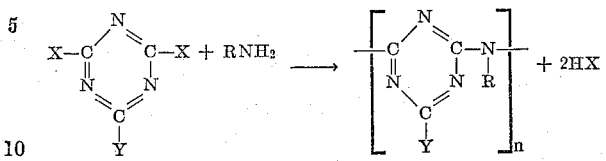

An example of a primary amine which may be employed in the invention is aniline.

Cross-linked polycondensates can be prepared by the method of the present invention by reacting the dihalo-s-triazine with ammonia or an amino-s-triazine in quantities sufficient to give cross-linking, i.e., between equivalent and equimolar quantities. Preferably each mole of dihalo-s-triazine is reacted with from 0.6 to 0.8 mole of ammonia or an amino-s-triazine having the formula

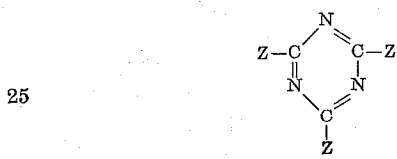

where each Z is an amino or an NHR group or an $NR_2$ group such that there are at least 3 replaceable hydrogen atoms in the groups Z.

The preparation of a cross-linked polycondensate employing ammonia can be represented as follows:

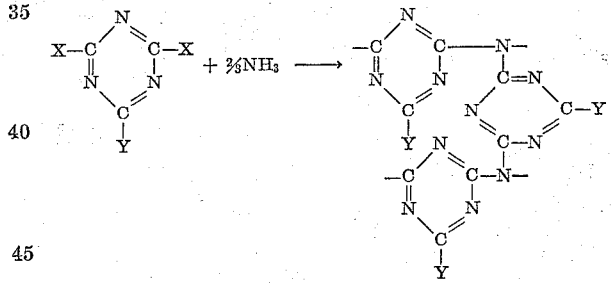

Examples of further nitrogen-containing compounds which may be employed in the preparation of linear polycondensates are primary amines having the formula $RNH_2$, where R is as defined above; examples of amino-s-triazines are 2-amino-4,6-diphenyl-s-triazine, 2-phenyl-4,6-dianilino-s-triazine, benzoguanamine and melamine.

Examples of nitrogen-containing compounds which may be employed in the preparation of cross-linked polycondensates are 2-amino-4-anilino-6-phenyl-s-triazine, trianilino-s-triazine, benzoguanamine and melamine.

The dihalo-s-triazine may be 2-phenyl-4,6-dichloro-s-triazine. Alternatively, the dihalo-s-triazine may be a disubstituted amino-dihalo-s-triazine and may be prepared in situ by reacting cyanuric chloride or bromide with a substantially equimolecular quantity of a secondary amine. Such a secondary amine is preferably diphenylamine or carbazole. An example of the in situ preparation of an amino-dihalo-s-triazine in the preparation of a linear polycondensate, employing a primary amine $RNH_2$ as the nitrogen containing compound may be represented as follows:

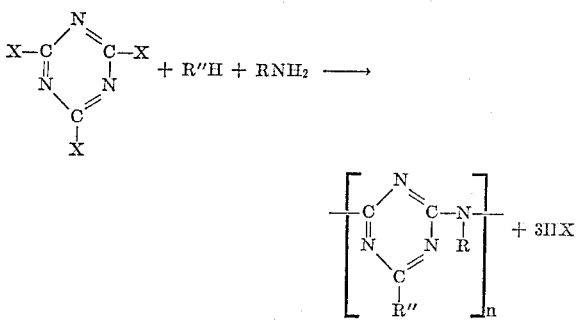

where R″=a disubstituted amino group, e.g., a diphenylamino or a carbazyl group.

The invention also includes methods in which mixtures of the dihalo-s-triazines and the nitrogen-containing compounds are reacted to give polycondensates with varied properties.

All the above described reactions may be carried out in a suitable solvent solution, with or without the use of a base to react with hydrogen halide formed during the reaction. The preferred method of effecting the reaction is to heat at temperatures of 200° to 400° C., a mixture of dry reactants in an inert atmosphere until fusion occurs. Heating is preferably continued in this temperature range until the evolution of the hydrogen halide is substantially complete. On cooling, the polycondensates are obtained.

Following is a description by way of example of methods of carrying the present invention into effect.

Example I 0.96 g. of aniline was added to 2.34 g. of 2-phenyl-4,6-dichloro-s-triazine in a tube under a dry nitrogen atmosphere. After the initial induction period, an exothermic reaction occurred. The reactants were then heated first at 210° C. and then up to 300° C., over a two hour period, until the evolution of hydrogen chloride ceased.

On cooling the reaction mixture, a hard, brown resin was obtained. It was soluble in dioxane and tetrahydrofuran and possessed a softening point of 200° C. The resin was thermally stable in air at 350° C. The resin was found to lose 1% and 3% by weight on heating for 8 hours at 300° C. and 350° C., respectively.

Example II

A mixture of 0.648 g. of aniline hydrochloride and 1.13 g. of 2-phenyl-4-6-dichloro-s-triazine was heated in a dry nitrogen atmosphere, first at 180° C. and then up to 300° C., over a one hour period, until evolution of hydrogen chloride had ceased. A hard, brown resin was obtained which was similar in properties and structure to that obtained in Example I. The resin was found to lose 0.5, 1.5, and 6.5% by weight on heating for 8 hours at 300° C., 350° C. and 400° C., respectively.

Example III

A mixture of 1.84 g. of cyanuric chloride and 1.69 g. of diphenylamine was placed in a tube in a dry nitrogen atmosphere. 0.93 g. of aniline was added dropwise. An exothermic reaction took place and after this had ceased, the tube was heated first at 140° C. and then at 300° C. for three hours. A hard, brown resin was obtained on cooling; it was soluble in dioxane and had a softening point of 220° C.

Example IV

A mixture of 1.84 g. of cyanuric chloride and 1.67 g. of carbazole was placed in a tube under a dry nitrogen atmosphere. 0.93 g. of aniline was added dropwise and the mixture heated, as in Example III. A hard, brown resin was again obtained; it was soluble in tetrahydrofuran and had a softening point of 200° C.

Example V

A mixture of 1.84 g. of cyanuric chloride, 1.69 g. of diphenylamine and 0.54 g. of ammonium chloride was heated in a tube, first at 130° C. and then slowly up to 300° C. After heating for 15 hours at 300° C., a hard, light brown polymer was obtained.

Example VI

A mixture of 2.26 g. of 2-phenyl-4,6-dichloro-s-triazine and 0.356 g. of ammonium chloride was heated in a tube in a nitrogen atmosphere. The temperature was slowly raised to 380° C. and then maintained for twelve hours. On cooling a hard, brown cross-linked polymer was obtained.

Example VII

A mixture of 2.76 g. of cyanuric chloride, 2.53 g. of diphenylamine and 0.535 g. of ammonium chloride was heated in a tube under the same conditions as in Example VI. A hard, brown, cross-linked polymer was again obtained.

Example VIII

A mixture of 2.76 g. of cyanuric chloride, 2.51 g. of carbazole and 0.535 g. of ammonium chloride was placed in a tube and heated in a dry nitrogen atmosphere. The temperature was slowly raised to 350° C. and held there until the evolution of hydrogen chloride had ceased. A hard, cross-linked polymer was obtained.

Example IX

A mixture of 1.87 g. of benzoguanamine and 4.52 g. of phenyl dichloro-s-triazine was heated together in a dry nitrogen atmosphere at 320° C. for 1½ hours. When evolution of hydrogen chloride ceased, a hard yellow cross-linked resinous product was obtained.

Example X

A mixture of 1.87 g. of benzoguanamine and 2.26 g. of phenyl dichloro-s-triazine was heated in a nitrogen atmosphere at 230° C. for 4 hours. On cooling, a pale yellow resin was obtained.

Example XI

A mixture of 3.69 g. of cyanuric chloride, 1.87 g. of benzoguanamine and 3.34 g. of carbazode was heated in a nitrogen atmosphere and the temperature slowly raised from 230° C. to 390° C. over a twelve hour period. A yellow cross-linked resin was obtained.

Example XII

A mixture of 1.84 g. of cyanuric chloride, 1.38 g. of melamine and 1.67 g. of carbazole was heated at 300° C. for 7 hours. After evolution of hydrogen chloride had ceased a pale yellow resin was obtained.

Example XIII 1.84 g. of cyanuric chloride, 2.24 g. of benzoguanamine and 1.67 g. of carbazole were heated together up to 350° C. over a 5 hour period. Hydrogen chloride was evolved and a greenish-brown opaque resinous product was obtained.

Example XIV 2.26 g. of phenyl dichloro-s-triazine and 1.51 g. of melamine were heated under dry nitrogen to 350° C. over a 6 hour period. Hydrogen chloride was evolved and a pale yellow resin obtained.

Example XV

A mixture of 0.9 g. of benzoguanamine, 3.4 g. of 2-phenyl-4,6-dichloro-s-triazine and 1.3 g. of aniline hydrochloride was heated in a glass tube in a nitrogen atmosphere for 20 hours at 260° C. Hydrogen chloride was evolved and a yellow resin was obtained on cooling.

Example XVI

A mixture of 7.5 g. of phenyl dichloro-s-triazine and 11.8 g. of triphenylmelamine was heated in a nitrogen atmosphere for 15 hours at 180 to 190° C. A pale yellow solid was obtained having a softening point of 260° C.

Example XVII

A mixture of 3.68 g. of cyanuric chloride, 3.74 g. of benzoguanamine and 3.38 g. of diphenylamine was heated in a dry nitrogen atmosphere for 20 hours at 260° C. A yellow resin was obtained having a softening point of 260° C.

Example XVIII

A mixture of 3.68 g. of cyanuric chloride, 252 g. of melamine and 3.38 g. of diphenylamine was heated in a dry nitrogen atmosphere for 14 hours at 300° C. A yellow resin was obtained. This polymer was subsequently cross-linked by reaction with hexamethylene tetramine.

The polycondensates as prepared by the method of the present invention are stable at high temperatures, and are suitable for many applications in the plastics industry. Polycondensates containing $NH_2$— or —NH— groups are useful curing agents for epoxy resins. The products have a variety of applications, for example, in surface coating, in casting, in adhesives and in moulding. They generally have high thermal stability and high heat distortion points.

Polycondensates containing $NH_2$— groups can be cured by reaction with formaldehyde or a formaldehyde producing substance. As is common in the plastics art, other materials may be added to the mixture before heating to effect curing to modify the properties of the cured materials; these materials include fillers, extenders, plasticisers and reinforcing agents.

Other polycondensates can be used to produce mouldings, laminate and surface coatings.

Example XIX 7.3 g. of butylamine was added dropwise to 22.6 g. of 2-phenyl-4,6-dichloro-s-triazine. After the initial exothermic reaction the mixture was warmed slowly to 300° C. as hydrogen chloride was evolved from the system. A light brown polymer was obtained softening at 160° C.

Example XX 2-phenyl-4,6-dichloro-s-triazine was heated with an equimolar quantity of ethylamine hydrochloride. Hydrogen chloride was evolved and a clear resin softening at 130° C. was obtained.

Examples XIX and XX illustrate the use of further primary amines in methods according to the invention. Examples of other primary amines which may replace those used in these examples are:

Propylamine
o, m and p methylaniline
α and β naphthylamine

The molecular weight of the polymers produced by the method of this invention depends mainly upon the proportion of the various reactants employed to prepare high molecular weight products. It is preferable to employ equimolecular proportions of these reactants.

It is generally preferred that R as defined above, is an alkyl, aryl or a substituted group of these hypes, the substituent being alkyl, aryl or halogen. It is preferred that the alkyl groups contain from 1 to 6 carbon atoms.

The polycondensates as prepared in this present invention are generally high temperature resistant materials, the best of which withstanding 350° to 400° C. They are suitable for many applications in the plastics industry. Polycondensates containing $NH_2$ or NH groups can be used as curing agents for epoxy resins in which application they improve the temperature resistant properties of these materials whether they be in cast, moulded or laminate form. Polycondensates containing $NH_2$ groups can be cured by reaction with formaldehyde or a formaldehyde-producing substance to produce temperature resistant moulding materials having good electrical properties. By the incorporation of materials, such as asbestos into compositions containing the polycondensates, mouldings suitable for use as brake-linings can be produced. Linear polymers can be deposited from solution in organic solvents to give films which can be stored at elevated temperatures to yield tough, adherent coatings on metals.

I claim:

1. A method of preparing polycondensates containing s-triazine nuclei linked together substantially exclusively by single nitrogen atoms which method comprises mixing (a) a dihalo-s-triazine having the formula:

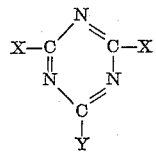

where X is selected from the group consisting of chlorine and bromine and Y is selected from the group consisting of R and $NR_2$ where R is an aryl radical with (b) a nitrogen-containing compound selected from the group consisting of from 0.5 to 1.5 moles, per mole of dihalo-s-triazine, of ammonia, from 0.5 to 1.5 moles, per mole of dihalo-s-triazine, of a primary mono-amine having the formula $RNH_2$, R being defined above, and from 0.5 to 2.0 moles, per mole of diahalo-s-triazine, of an amino-s-triazine having the formula:

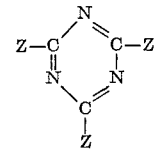

where Z is selected from the group consisting of R, NHR, and $NH_2$ groups, R being in each instance as defined above, the amino-s-triazine containing at least two replaceable hydrogen atoms forming part of at least one amino group directly attached to the s-triazine ring, heating the reaction mixture to obtain a polymeric product wherein the moiety of reactants (a) and (b) are coupled through —C—N—C— linkages.

2. A method as claimed in claim 1 wherein the nitrogen containing compound is ammonia.

3. A method as claimed in claim 1 wherein each mole of dihalo-s-triazine is reacted with from 1.0 to 1.2 moles of a primary amine so as to give substantially linear polycondensates.

4. A method as claimed in claim 1 wherein the primary mono-amine is aniline.

5. A method as claimed in claim 1 wherein each mole of dihalo-s-triazine is reacted with from 1.0 to 1.2 moles of ammonia so as to give substantially linear polycondensates.

6. A method as claimed in claim 1 wherein each mole of dihalo-s-triazine is reacted with from 0.6 to 0.8 mole of ammonia so as to give cross-linked polycondensates.

7. A method as claimed in claim 1 wherein the amino-s-triazine is benzoguanamine.

8. A method as claimed in claim 1 wherein the dihalo-s-triazine is 2-phenyl-4,6-dichloro-s-triazine.

9. A method as claimed in claim 1 wherein the dihalo-s-triazine is a disubstituted aminodihalo-s-triazine, and is prepared in situ by reacting cyanuric chloride with a substantially equimolecular quantity of a secondary amine.

10. A method as claimed in claim 9 wherein the secondary amine is diphenylamine.

11. A method as claimed in claim 1 wherein the reaction is effected by heating a mixture at a temperature of from 200° to 400° C., until the evolution of hydrogen halide is substantially complete.

12. A method as claimed in claim 1 wherein the nitrogen-containing compound is a primary amine in the form of its hydrohalide.

13. A method as claimed in claim 1 wherein the amino-s-triazine is melamine.

14. A method as claimed in claim 1 wherein the dihalo-s-triazine is a disubstituted amino-dihalo-s-triazine, and is prepared in situ by reacting cyanuric bromide with a substantially equal molecular quantity of a secondary amine.

15. A method as claimed in claim 9 wherein the secondary amine is carbazole.

16. A method as claimed in claim 1 of preparing substantially linear polycondensates wherein each mole of the dihalo-s-triazine is reacted with from 1.0 to 1.2 moles of an amino-s-triazine having precisely two replaceable hydrogen atoms forming part of at least one amino group directly attached to the s-triazine ring.

17. A method as claimed in claim 1 wherein the amino-s-triazine is 2-amino-4,6-diphenyl-s-triazine.

18. A method as claimed in claim 1 wherein the amino-s-triazine is 2-phenyl-4,6-dianilino-s-triazine.

References Cited in the file of this patent

UNITED STATES PATENTS

| | | |
|---|---|---|
| 2,560,825 | Schaefer | July 15, 1951 |
| 2,824,088 | Neher | Feb. 18, 1958 |
| 2,884,383 | Grundmann et al. | Apr. 28, 1959 |